(12) United States Patent
Arukhe et al.

(10) Patent No.: US 11,391,132 B2
(45) Date of Patent: Jul. 19, 2022

(54) TURBINE POWERED ELECTRICAL SUBMERSIBLE PUMP SYSTEM

(71) Applicant: Saudi Arabian Oil Company, Dhahran (SA)

(72) Inventors: James Arukhe, Dhahran (SA); Emeka Agbo, Al Rakka Eastern Province (SA); Jaafar Sawad, Sayhat (SA); Fahad Altwimi, Riyadh (SA); Mohannad Abo Khamseen, Alkhobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 154 days.

(21) Appl. No.: 16/886,715

(22) Filed: May 28, 2020

(65) Prior Publication Data

US 2021/0372243 A1     Dec. 2, 2021

(51) Int. Cl.
*E21B 43/12*     (2006.01)
*F04B 17/03*     (2006.01)

(52) U.S. Cl.
CPC ............ *E21B 43/128* (2013.01); *F04B 17/03* (2013.01)

(58) Field of Classification Search
CPC .......... E21B 43/12; E21B 43/128; F04B 17/03
See application file for complete search history.

(56) References Cited

U.S. PATENT DOCUMENTS

| | | | |
|---|---|---|---|
| 4,292,011 A | 9/1981 | Erickson | |
| 5,285,204 A * | 2/1994 | Sas-Jaworsky | G01V 11/002<br>340/856.1 |
| 5,959,547 A * | 9/1999 | Tubel | E21B 47/107<br>340/853.2 |
| 6,046,685 A * | 4/2000 | Tubel | E21B 41/00<br>340/853.2 |
| 6,873,267 B1 * | 3/2005 | Tubel | E21B 43/12<br>166/250.15 |
| 7,699,102 B2 | 4/2010 | Storm | |

(Continued)

FOREIGN PATENT DOCUMENTS

| | | |
|---|---|---|
| CN | 202017533 U | 10/2011 |
| WO | 2018200463 A1 | 11/2018 |

OTHER PUBLICATIONS

ISRWO dated Sep. 22, 2021, in the prosecution of International PCT application No. PCT/US2021/070628, 16 pages.

*Primary Examiner* — Patrick Hamo
(74) *Attorney, Agent, or Firm* — Bracewell LLP; Constance G. Rhebergen; Linda L. Morgan

(57) ABSTRACT

A turbine-powered electrical submersible pump (ESP) that has intake and discharge ports. The ESP intakes wellbore fluid from the intake port at an intake pressure, pressurizes the fluid, and discharges the fluid from the discharge port at a discharge pressure higher than the intake pressure. A motor is coupled to and drives the ESP. A turbine generator has a flow passage disposed between turbine intake and discharge ports. The turbine intake port is fluidly coupled to the pump discharge port. The turbine generator generates electric power from the pressurized wellbore fluid flowing through the flow passage and is electrically coupled to the motor and powers the motor with the generated electric power. A rechargeable battery is electrically coupled to the motor and provides power to initially start the motor. The turbine generator is further electrically coupled to the battery and recharges the battery.

21 Claims, 6 Drawing Sheets

(56) References Cited

U.S. PATENT DOCUMENTS

| | | | |
|---|---|---|---|
| 8,581,427 B2 * | 11/2013 | Schoonover | ........ E21B 41/0085 |
| | | | 290/1 R |
| 10,018,021 B2 | 7/2018 | Romer et al. | |
| 10,250,103 B2 | 4/2019 | Gawski et al. | |
| 10,392,960 B2 | 8/2019 | Hunter et al. | |
| 2012/0067567 A1 | 3/2012 | Rytlewski et al. | |
| 2015/0114632 A1 * | 4/2015 | Romer | .................. F16C 32/044 |
| | | | 166/305.1 |
| 2015/0345260 A1 | 12/2015 | Green et al. | |
| 2018/0030810 A1 * | 2/2018 | Saldanha | ................ E21B 34/06 |
| 2018/0179860 A1 | 6/2018 | McMullen | |
| 2018/0355703 A1 | 12/2018 | Al-Dossary | |
| 2019/0264518 A1 | 8/2019 | Al-Gouhi et al. | |
| 2019/0316445 A1 * | 10/2019 | Fripp | .................. E21B 41/0085 |
| 2022/0049695 A1 * | 2/2022 | Romer | .................... F04B 17/03 |

* cited by examiner

TURBINE POWERED ELECTRICAL SUBMERSIBLE PUMP SYSTEM

TECHNICAL FIELD

Embodiments relate generally to downhole power generation, and more particularly to a turbine powered electrical submersible pump system.

BACKGROUND

A rock formation that resides under the Earth's surface is often referred to as a "subsurface" formation. A subsurface formation that contains a subsurface pool of hydrocarbons, such as oil and gas, is often referred to as a "hydrocarbon reservoir." Hydrocarbons are typically extracted (or "produced") from a hydrocarbon reservoir by way of a hydrocarbon well. A hydrocarbon well normally includes a wellbore (or "borehole") that is drilled into the reservoir. For example, a hydrocarbon well may include a wellbore that extends into the rock of a reservoir to facilitate the extraction (or "production") of hydrocarbons from the reservoir, the injection of fluids into the reservoir, or the evaluation and monitoring of the reservoir. Once the wellbore is drilled, various forms of well completion components may be installed to control and enhance efficiency of producing fluids from the hydrocarbon reservoir. For example, an electrical submersible pump (ESP) may be installed downhole in the production tubing of the wellbore to ensure the production fluid flows to the surface with at least a predetermined flow rate or pressure at the wellhead.

Downhole components like the ESP require power to operate. One way to provide this power downhole is by running an external cable from surface production facilities to the downhole component. This requires running a long high-tension power cable from the wellhead to the downhole equipment that may be disposed thousands of feet underground. The power cable must further endure adverse temperature and pressure conditions of the downhole environment inside the wellbore. These adverse conditions may have negative effects on the integrity of the power cable, causing damage, burns, voltage fluctuations, connection issues, and other problems with the downhole component being powered by the surface based external power cable. Further, in case of power cable related failure, the downhole component and/or the high-tension power cable must be replaced by a workover rig, which takes a relatively long time to mobilize or execute and adds to the total cost in the form of lost or deferred production. A better mechanism to provide power for downhole components (e.g., ESP) is desirable.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, an artificial lift system for artificially lifting fluid from a wellbore includes a pump that has a pump intake port and a pump discharge port, wherein the pump is adapted to intake wellbore fluid from the pump intake port at a pump intake pressure, pressurize the wellbore fluid, and discharge the wellbore fluid from the pump discharge port at a pump discharge pressure that is higher than the pump intake pressure; a prime mover that is coupled to the pump and that drives the pump; and a turbine generator that has a flow passage for the pressurized wellbore fluid, the flow passage being disposed between a turbine intake port and a turbine discharge port of the turbine generator. The turbine intake port is fluidly coupled to the pump discharge port, wherein the turbine generator is configured to generate electric power from the pressurized wellbore fluid flowing through the flow passage of the turbine generator, and wherein the turbine generator is electrically coupled to the prime mover and is configured to power the prime mover with the electric power generated from the flowing pressurized wellbore fluid.

In another embodiment, a method for artificially lifting fluid from a wellbore includes activating a battery of an artificial lift unit disposed downhole at a predetermined pump setting depth inside a tubular space of a production tubing of a wellbore; supplying power from the activated battery to a prime mover of the artificial lift unit to power the prime mover with battery power; driving a pump of the artificial lift unit with the prime mover to pressurize wellbore fluid flowing in from an intake port of the pump, and discharge the pressurized wellbore fluid from a discharge port of the pump; generating electric power from the pressurized wellbore fluid by flowing the pressurized wellbore fluid discharged from the discharge port of the pump through a flow passage of a turbine generator of the artificial lift unit; and supplying the electric power generated by the turbine generator to the prime mover to power the prime mover with the turbine generator electric power. In yet another embodiment, the method may be embodied in computer executable program code and stored in a non-transitory storage device.

In yet another embodiment, a turbine-powered electrical submersible pump unit includes an electrical submersible pump (ESP) that has a pump intake port and a pump discharge port, wherein the ESP is adapted to intake wellbore fluid from the pump intake port at a pump intake pressure, pressurize the wellbore fluid, and discharge the wellbore fluid from the pump discharge port at a pump discharge pressure that is higher than the pump intake pressure; a motor that is coupled to the ESP and that drives the ESP; a turbine generator that has a flow passage for the pressurized wellbore fluid, the flow passage being disposed between a turbine intake port and a turbine discharge port of the turbine generator, wherein the turbine intake port is fluidly coupled to the pump discharge port, wherein the turbine generator is configured to generate electric power from the pressurized wellbore fluid flowing through the flow passage of the turbine generator, and wherein the turbine generator is electrically coupled to the motor and is configured to power the motor with the electric power generated from the flowing pressurized wellbore fluid; and a rechargeable battery that is electrically coupled to the motor and is configured to initially power the motor, wherein the turbine generator is further electrically coupled to the battery and is configured to recharge the battery.

BRIEF DESCRIPTION OF THE DRAWINGS

For a more complete understanding of this disclosure, reference is now made to the following brief description.

Figure 1:
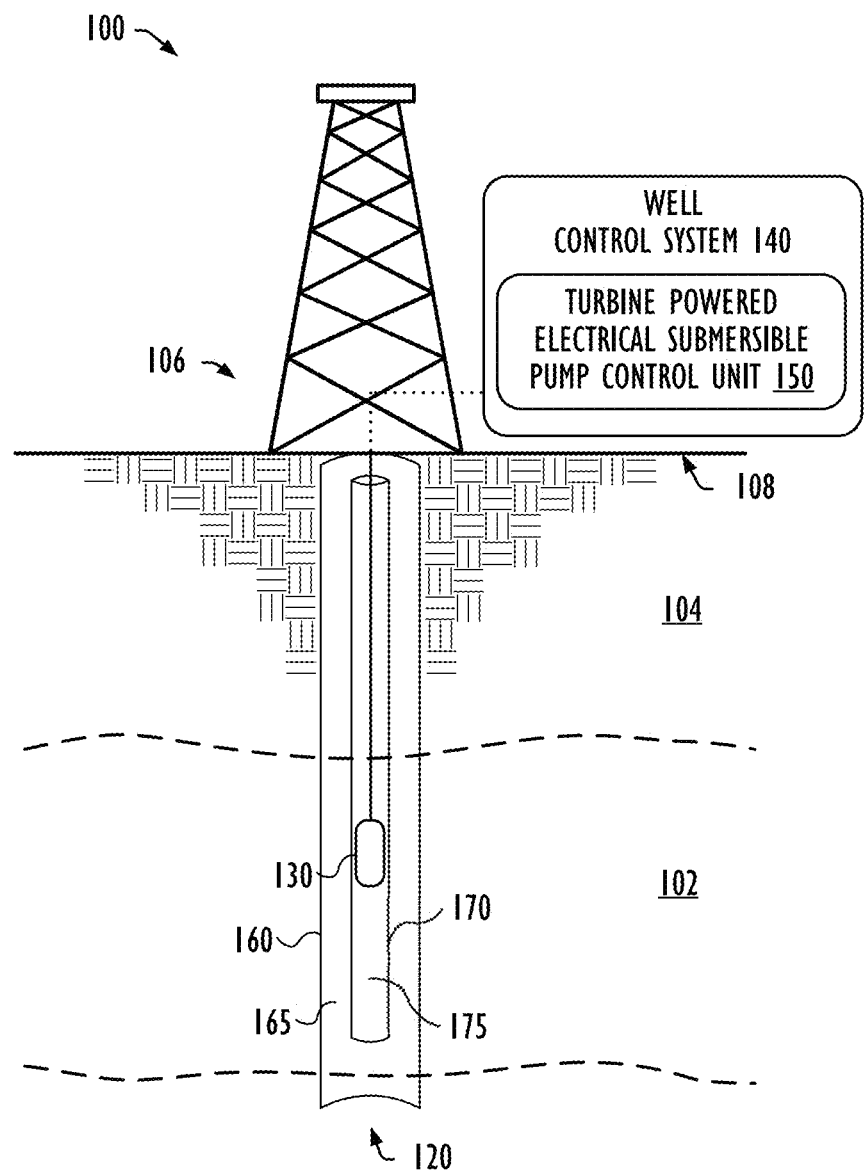
FIG. 1 is a schematic diagram of a well environment in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure.

DETAILED DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

As used herein, the term "hydro turbine generator" or "turbine generator" refers to both the turbine and the generator components of the turbine powered ESP system. The turbine generator receives mechanical energy as input (e.g., by rotation of the hydro turbine from hydraulic and kinetic energy of reservoir fluid flowing through the production tubing of the wellbore), and converts the mechanical energy into electrical energy.

This disclosure pertains to a turbine powered electrical submersible pump (ESP) system for use in oil service applications. Conventional ESPs require an external cable running from surface production facilities to the downhole ESP to provide the required electrical power for operating the ESP system. Numerous problems persist with use of such external power cable based ESP systems. First, although the power cable of conventional ESPs is installed in a tubing casing annulus (TCA), this cable may penetrate through a packer (e.g., production packer) to communicatively couple to a downhole ESP unit and at least a part of the power cable below the packer may be exposed to formation (e.g., production) fluids, and the high pressures and temperatures in the wellbore. These adverse wellbore conditions may have negative effects on the integrity of the ESP power cable, often causing cable damage, burns, voltage fluctuations, connection issues, and other problems. In case of such problems (e.g., power cable related failures), the conventional ESP system requires replacement of the cable and/or the ESP unit components by a workover rig, which takes a relatively long time to mobilize or execute and adds to the total cost in the form of lost or deferred production. Conventional external cable based ESP systems also necessitate the cost of the high-tension external power cables and corresponding complex surface based power infrastructure.

Techniques disclosed herein look to overcome the above problems of conventional ESP systems by implementing a turbine powered ESP system that produces downhole, the necessary electric power for operating the ESP unit, thereby eliminating the need for an external power cable running from the surface to the ESP unit. The turbine powered ESP unit according to the present disclosure may include an electric motor, a submersible pump (or another type of pump), a special high-voltage battery, a turbine, and a power generator (e.g., voltage regulator, alternator), among other components, that are integrated into one compact piece that is disposed within the wellbore (e.g., within production tubing of the wellbore at a predetermined depth). During operation, the ESP unit may be initially started using the high-voltage battery (e.g., by operating a hydraulic line from the surface transmitting pressure to the ESP battery, or by wirelessly operating/activating the battery) to power the pump motor and cause the ESP to pump wellbore (e.g., production) fluid to the surface via the turbine generator of the ESP unit. As the production fluid flows through the turbine to the surface production facilities, the turbine rotates due to kinetic energy of the fluid flow, and hydro-electric current may be generated by the generator of the unit by converting the mechanical energy of rotation of the turbine into electrical energy. This electrical energy generated downhole may be used to continuously power the ESP motor (and optionally, other ESP unit components like sensors) while the battery may be made redundant and recharged using the generated hydro-electric power.

The ESP system may also include a control unit and one or more sensors that detect sensor data related to one or more components of the ESP unit. The sensor data may be transmitted through the casing or tubing of the wellbore to a surface based ESP control unit. The ESP control unit may receive the sensor data, and transmit control signals to control one or more downhole components of the ESP unit via a bi-directional communication mechanism (e.g., using fiber optic communication, fluid harmonics, and the like). Since the ESP system may generate its own power for the downhole components, no external high-tension cable from the surface based equipment at the wellhead to the ESP unit components downhole is required. Further, contrary to conventional ESP systems, which may require a workover rig for replacement or maintenance, the turbine based ESP system according to the present disclosure can be installed or replaced via slickline or wireline, thereby substantially reducing the operational cost of replacing the ESP system in the event of failure, maintenance, or repair, and also reducing downtime. Further, since no external high-tension cable is required, ESP system failure rate may be reduced, and well intervention and workover operations can be minimized.

FIG. 1 is a diagram that illustrates well environment 100 in accordance with one or more embodiments. In the illustrated embodiment, well environment 100 includes reservoir ("reservoir") 102 located in subsurface formation ("formation") 104, and well system ("well") 106. Formation 104 may include a porous or fractured rock formation that resides underground, beneath the Earth's surface ("surface") 108. Reservoir 102 may be a hydrocarbon reservoir, and well 106 may be a hydrocarbon well, such as an oil well. In the case of the well 106 being a hydrocarbon well, reservoir 102 may be a hydrocarbon reservoir defined by a portion of formation 104 that contains (or that is determined contain to or expected to contain) a subsurface pool of hydrocarbons, such as oil and gas, that coexist with formation connate water. Formation 104 and reservoir 102 may each include different layers of rock having varying characteristics, such as varying degrees of lithology, permeability, porosity and fluid saturations. In the case of well 106 being operated as a production well, well 106 may facilitate the extraction of hydrocarbons (e.g., "production" of production fluid) from reservoir 102. In the case of well 106 being operated as an injection well, well 106 may facilitate the injection of substances, such as gas or water, into reservoir 102 (e.g., injection of injection fluid). In the case of well 106 being operated as a monitoring well, well 106 may facilitate the monitoring of various characteristics of formation 104 or reservoir 102, such as reservoir saturation or pressure.

Well 106 may include wellbore 120 and well control system 140. Well control system 140 may control various operations of well 106, such as well drilling operations, well completion operations, well production operations, well and formation monitoring and control operations, or well maintenance operations. In some embodiments, control logic of control system 140 may be implemented on a computer system that is the same as or similar to computer system 600 described with regard to at least FIG. 6. As shown in FIG. 1, well control system 140 may include ESP control unit 150. ESP control unit 150 (e.g., control module) may be configured to operate and control one or more components of ESP unit 130 disposed downhole. ESP unit 130 (e.g., artificial lift unit or system) may be configured to generate its own power to pump fluid (e.g., production fluid) to surface 108 so that the fluid is output at the wellhead at a predetermined set flow rate or pressure. Although FIG. 1 shows ESP control unit 150 as being included within well control system 140, control logic of ESP control unit 150 may be distributed across multiple locations (e.g., locations downhole inside wellbore 120, locations remote to well environment 100, and the like) or provided or otherwise operate outside well control system 140 and be communicatively coupled thereto. For example, control logic of ESP control unit 150 may at least partially be implemented downhole by components of ESP unit 130.

Wellbore 120 (or "borehole") may include a bored hole that extends from surface 108 into a target zone of formation 104, such as reservoir 102. An upper end of wellbore 120, at or near surface 108, may be referred to as the "uphole" end of wellbore 120. A lower end of wellbore 120, terminating in formation 104, may be referred to as the "downhole" end of wellbore 120. Wellbore 120 may be created, for example, by a drill bit boring through formation 104 and reservoir 102. Wellbore 120 may provide for the circulation of drilling fluids during drilling operations, the flow of hydrocarbons (e.g., oil and gas; production fluid) from the reservoir 102 to the surface 108 during production operations, the injection of substances (e.g., water; injection fluid) into formation 104 or reservoir 102 during injection operations, or the communication of monitoring devices (e.g., logging tools) into the formation 104 or the reservoir 102 during monitoring operations (e.g., during shut-in or flow well logging operations). In some embodiments, wellbore 120 includes cased or uncased (or "open-hole") portions. A cased portion may include a portion of the wellbore 120 lined with casing (e.g., the uphole end of the wellbore 120 may be lined with casing pipe and cement). An uncased portion may include a portion of the wellbore 120 that is not lined with casing (e.g., the open-hole, downhole end of the wellbore 120).

As shown in FIG. 1, wellbore 120 may be encased by outer casing 160 that separates and isolates wellbore 120 from surrounding formation 104 and reservoir 102 and associated subsurface materials (e.g., water, hydrocarbons, and the like). Although not shown in FIG. 1, within outer casing 160 of wellbore 120, one or more inner casings may be disposed so as to define an annular space between an outer surface of an inner casing and an inner surface of outer casing 160. Further, as shown in FIG. 1, within the innermost casing of wellbore 120 (e.g., casing 160 in FIG. 1), wellbore 120 may include tubular 170, that defines tubular space 175, and that creates annular space 165 (e.g., tubing-casing annulus (TCA), well annulus, and the like) between an outer surface of tubular 170 and an inner surface of casing 160. Although FIG. 1 shows wellbore 120 housing tubular 170 as being encased by outer casing 160, this is not intended to be limiting. Additional or fewer casings and/or tubulars may be included in wellbore 120, resulting in the formation of more or less well annular spaces 165 (e.g., one or more tubing-casing annulus, casing-casing annulus, and the like). When well 106 is operated as a production well, production fluid may be passed up to the surface through tubular 170. Although FIG. 1 illustrates well 106 as being an onshore well, this may not necessarily be the case. In another embodiment, well 106 may be an offshore well with wellbore 120 penetrating the seabed to reach and extract production fluids from reservoir 102. In case well 106 is an offshore well, components of well control system 140 may be provided on an offshore platform associated with and fluidly coupled to wellbore 120.

Further, as shown in FIG. 1, well 106 may be equipped with turbine powered ESP unit 130 to optimize production of hydrocarbon fluids and "lift" well 106. ESP unit 130 may be lowered into and disposed in production tubing 170 of wellbore 120 at a predetermined setting depth. Since ESP unit 130 is disposed and operated downhole in wellbore 120, ESP unit 130 is designed and adapted to operate in a harsh production environment (e.g., exposed to hydrogen sulfide, high temperatures, formation fluids, production fluids, injection fluids, and the like) so as to minimize impact on its run life.

As stated previously, conventional ESP units require an external power cable to power the ESP motor. This external cable may run from production facilities at surface 108 to the downhole ESP unit. The high-tension power cable in such conventional systems may be installed in the tubing-casing annulus (e.g., well annulus 165) of the well and may connect with ESP unit components like the pump motor by penetrating through the production packer on a downhole side of the ESP unit. As such, part of the power cable below the packer may be exposed to the harsh production environment conditions downhole including high pressure and temperature, formation fluids, and the like. These adverse wellbore conditions have negative effects on the integrity of the ESP power cable, and invariably result in failures of the conventional ESP units. Indeed, power cable related issues is a major cause of conventional ESP system failures. Moreover, ESP unit change out arising from surface cable related failure results in reduced run life for such conventional ESP systems and is a major cause of deferred production and unrealized revenue from the wellsite.

To overcome the above problems, ESP unit 130 of FIG. 1 according to the present disclosure is a turbine powered ESP unit that has a retrievable, compact, and modular design and that is configured to generate the required electrical power for operating components of the ESP unit downhole, so as to eliminate the need for a power cable running from surface 108 to ESP unit 130, thereby reducing or eliminating incidents of cable related failures. ESP unit 130 is configured to operate continuously by utilizing hydro-electricity generated from a turbine generator thereof, and has a compact design (e.g., single piece) that is retrievable from production tubing 170 by simply using a wireline or slickline, without requiring a costly workover rig. Since ESP unit 130 generates required electrical power locally (i.e., downhole), ESP unit 130 reduces operation cost by eliminating use of power cables that are conventionally a major source of ESP system failures. Turbine powered ESP unit 130 is thus a cost effective ESP system that may significantly increase ESP run life and reduce overall installation and operation cost. Turbine powered ESP unit 130 also produces several additional advantages over conventional external power cable based ESP units. First, ESP unit 130 is a compact system that can be installed and retrieved riglessly utilizing slickline or wireline. Second, "killing" of well 106 is not required for replacement of ESP unit 130 and as a result, no damage is caused to reservoir 102. Third, since ESP unit 130 generates its own power, all cable connections are embedded within a casing of the compact ESP unit 130 and no external cable is required. Fourth, the integrated, modular and compact design of ESP unit 130 leads to reduced ESP failure rate and increased run life, since the external cable, which is the major cause of failure, can be eliminated. Fifth, ESP unit 130 is cost effective when compared to conventional ESPs in that the replacement cost is drastically reduced. Sixth, the increased ESP run life minimizes associated risks with well intervention and workover operations to replace ESP unit 130.

ESP unit 130 may include a plurality of components including a submersible pump (or any other suitable type of pump), pump motor, turbine, generator, rechargeable high-voltage battery, and the like (details of ESP unit 130 described in connection with FIG. 2 below). The pump and motor of ESP unit 130 may be any commercially available pump and motor that are suitable for wellbore application, and in particular, for artificial lift systems. For example, the pump and motor of ESP unit 130 may be a Novomet pump, and a Novomet motor. Any suitable pump and motor combination that is configured to generate a required or target amount of fluid pressure and flow rate, while reliably and enduringly operating as an artificial lift system in the harsh downhole production environment may be utilized. The particular design, layout, and technical specifications of the pump and motor of ESP unit 130 are not intended to be limiting. They may be selected according to well-established selection protocols and determined based on criteria like operating rate, downhole wellbore dimensions, well operating conditions, downhole reservoir fluid pressure, fluid types, flow regimes, and the like.

As an example, consider an ESP system that is being designed for a well with 6.36 inches casing inside diameter (e.g., diameter of casing 160 of FIG. 1), 4.5 inches tubing outside diameter (e.g., outside diameter of production tubing 170), and 3.795 inches drift internal diameter (e.g., internal diameter of production tubing 170). Further consider that the target for this well is to produce 3,000 barrels of fluid per day, and it is determined based on engineering that this well will require an artificial lift system to optimize production and achieve the target production of 3,000 barrels of fluid per day. Still further, consider that it is determined based on engineering that the pump of such an artificial lift system should be set at a depth of 5,000 feet below the surface, that the pressure at this depth is 2,000 psi, and that the reservoir temperature at this depth is 152° F. In this example, assume the formation fluids contain only oil with a specific gravity of 0.89. Yes still further, consider that the target for such a well is to flow at a surface wellhead pressure of 500 psi.

The above described exemplary conditions (i.e., design parameters) can be input as design parameters on a corresponding well model generated using physics correlation software that reasonably or accurately models artificial lift systems. An example of such modelling software is PROSPER software provided by Petroleum Experts having headquarters in Edinburgh, United Kingdom. By inputting the above described design parameters into the well modelling software, inflow performance of such a well can be calculated, and corresponding requirement specifications (e.g., pump duty, pump intake pressure, pump discharge pressure, and the like) of an electrical submersible pump (or other type of pump) that will be needed for such a well and that will produce the target wellhead pressure (e.g., 500 psi at the surface) can be identified. Further, based on the identified pump requirement specifications, a suitable pump (e.g., specific model and manufacturer) that meets the design parameters (e.g., a pump which can fit in the 3.795 inch tubing inside diameter) and requirement specifications can be identified.

Next, based on the selected pump, additional parameters like the number of pump stages, power required, pump efficiency, power outlet temperature can be determined by the well modelling software. Still further, the well modelling software may also identify one or more corresponding motors that can power the selected pump. And based on a selected one of the one or more motors, estimates of the current used, motor efficiency, motor power generated, motor speed as well as Torque on Shaft and Motor Power Factor can be identified from the well modelling software. The well modelling software can thus be used to select a commercially available pump and motor for ESP unit 130 that will meet the design parameters of well 106, as well as meet the corresponding requirement specifications and additional parameters of the pump and motor identified by the well modelling software.

Further, the turbine generator, and rechargeable battery components of ESP unit 130 can also be selected based on the specifications of the selected pump and motor of ESP unit 130 and based on the design parameters of well 106, so that the turbine generator and battery components of ESP unit 130 can meet, for example, the size and dimensionality requirements of ESP unit 130 while also generating a sufficient amount of power required to power the selected pump and motor of ESP unit 130. Any commercially available turbine generator and rechargeable battery can be selected for ESP unit 130 so long as they are compatible with the selected pump and motor of ESP unit 130 and are configured to meet the input design parameters of well 106, and the requirement specifications and additional parameters of ESP unit 130 identified by the well modelling software.

Figure 2:
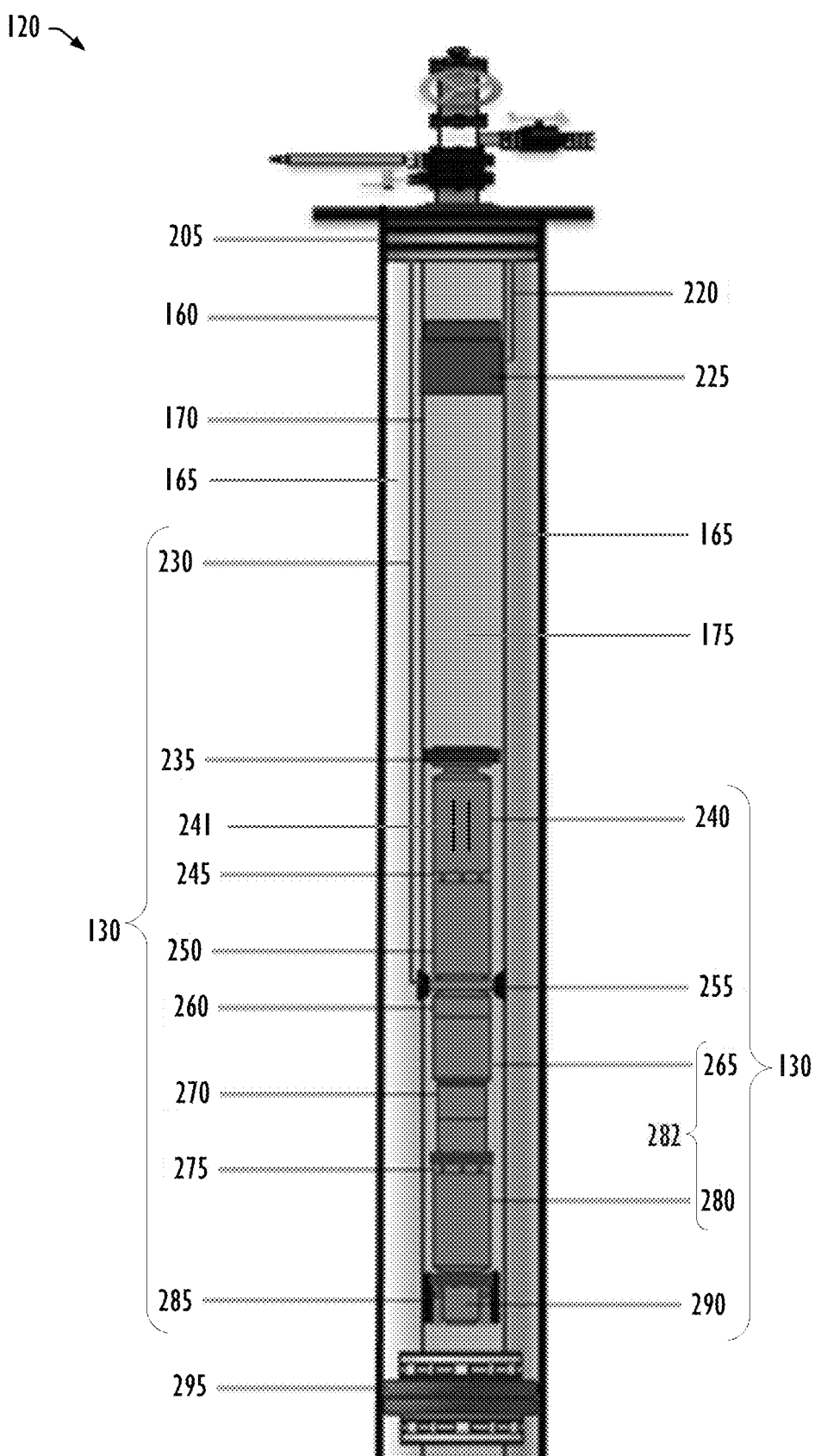
FIG. 2 is a schematic diagram of a wellbore equipped with a turbine powered ESP unit in accordance with one or more embodiments.

FIG. 2 is a schematic diagram of wellbore 120 equipped with ESP unit 130 in accordance with one or more embodiments. Elements in FIG. 2 that are generally the same as those in FIG. 1 are denoted by like reference numerals and the description thereof will be omitted to avoid duplication. As shown in FIG. 2, the wellbore may include production tubing hanger 205 and production tubing packer 295, and ESP unit 130 may be disposed at a predetermined depth below the surface in tubular space 175 defined by production tubing 170 between production tubing hanger 205 and production tubing packer 295. As also shown in FIG. 2, wireline retrievable subsurface safety valve (WRSSV) 225 may also be disposed inside tubular space 175 and be communicatively coupled with hydraulic control line 220 that is disposed in TCA 165 and adapted to apply hydraulic pressure to WRSSV 225 to actuate or control WRSSV 225 in case of emergency. When activated, WRSSV 225 may be configured to stop flow of production fluid from production tubing 170 to surface.

Further, as shown in FIG. 2, wellbore 120 is equipped with ESP unit 130 for vertical lift performance enhancement by means of one or more pumps 280 to pump wellbore fluid (e.g., production fluid) from wellbore 120 to the surface. ESP unit 130 may include ESP module 282 (including pump 280 and motor 265 coupled to each other), hydro turbine generator 240, and battery 250, among other components that are integrated into one compact piece that is disposed at a predetermined pump setting depth within wellbore 120 (e.g., ESP unit 130 disposed within production tubing 170 of wellbore 120). Pump 280 may be an electrical submersible pump or any other type of pump that is configured to lift wellbore fluid (e.g., production fluid) to surface with a predetermined target surface wellhead pressure. Motor 265 (e.g., prime mover) may be an electric motor or other type of device that is coupled to and that drive pump 280. In the example shown in FIG. 2, ESP unit 130 further includes battery activation hydraulic control line 230, tubing packoff/discharge port 235 (e.g., turbine discharge port), turbine intake port 245, activation sub 255, ESP monitoring tool/downhole gauge 260, lower and upper seals 270, pump discharge port 275, ESP latch/anchor 285, and pump intake port 290. Outside diameter of each component of ESP unit 130 may be less than the inside diameter of production tubing 170 (i.e., less than an internal drift diameter of tubular space 175). For example, outside diameter of each of ESP 280 (e.g., electrical submersible pump or any other type of pump for an artificial lift system for downhole application to lift fluids to surface), motor 265, hydro turbine generator 240, battery 250, activation sub 255, ESP monitoring tool/downhole gauge 260, lower and upper seals 270, and ESP latch/anchor 285 may be less than 3.795 inches. ESP unit 130 may be disposed at a predetermined setting depth inside production tubing 170 by using ESP latch/anchor 285 that is coupled to the inside wall of production tubing 170 to fix (e.g., latch or anchor) ESP unit 130 at a specific depth inside production tubing 170.

As explained previously, each of pump 280 and motor 265 may be a commercially available component that is selected based on design parameters, and corresponding requirement specifications identified by well modelling software for a particular well that is to be equipped with ESP unit 130. In the example described above in which an ESP system is to be installed for a well with 4.5 inches production tubing outside diameter (or 3.795 inches drift internal diameter) that is to produce 3,000 barrels of fluid per day (3 MBPD), where the pump is to be set at a depth of 5,000 feet, where the pressure at this depth is 2,000 psi, where the formation fluids contains only oil with a specific gravity of 0.89, and where the well is required to flow at a surface wellhead pressure of 500 psi, the corresponding well software model may determine that such an ESP system would require a 3.62" series pump with its most efficient operating point at 3 MBPD (e.g., 3.62" series pump rated for 2012-3018 reservoir barrels per day). The well model may further determine that a pump of this size to should have 150 stages to lift the fluids to surface and generate the required differential pressure. The well model software may further determine the power requirement to operate this size pump to be 98 HP, and add 10 HP to operate the seals of the system and compensate for losses due to overall system efficiency.

That is, the well software model may determine the minimum motor power requirement to be 108 HP based on input design parameters (e.g., motor rated for 3600 V, 28 A, and 134.102 HP) and a minimum power cable requirement to be "Copper 1.32 (volts/100 ft); 50 Amp max." As a result, the well software model may identify from among a variety of pumps, motors and copper cable types available from suppliers, a shortlist of (one or more) pumps, motors and copper cables that meet determined power, voltage, and current rating requirements that would be adequate to operate ESP unit 130 for the particular well site that is to be equipped with ESP unit 130 to provide artificial lift. In the example described above, the well software model may determine the power, voltage, and current rating to be 134 HP/3,600 V/28 A.

Exemplary manufacturers and suppliers of pumps and motors that may be suitable for ESP unit 130 include Schlumberger, Baker Hughes, Borets, Novomet, Alkhorayef Petroleum Company, and the like. The physical size and operating power requirements of the system vary according to the selected pump's intended objectives and operating downhole environment. Motors and pumps for oil service are commercially available with relatively small sizes in diameter from between 3.38 to 3.75 inches, possible for installation in tubing or casing of 4.5 inch outside diameter. Motor and pump ranges for use in 5.0 inch outside diameter tubing could be from 3.62 inches to 4.06 inches. Motor and pump ranges for use in 5.5 inch outside diameter tubing could be from 4.06 inches to 4.56 inches. Motor and pump ranges for use in 6.625 inch outside diameter tubing could be from 5.13 inches to 5.40 inches. Motor and pump sizes can be as large as 7 inches or more, if a larger system is required. Motor and pump ranges for use in 7 inch outside diameter tubing could be from 5.38 inches to 5.62 inches. Motor power output for commercially available motors have a broad horsepower range from 20 HP to 760 HP and a voltage requirement ranges from 400V to 4800 V or more. Examples of commercially available pumps for ESP unit 130 determined to meet the design parameters of well 106 by the well software model may include the following: (1) GE_ESP_TA2700_3.35 in (1900-3400 RB/day); (2) GE_ESP_TA2700 FLOAT 3.375" (1900-3400 RB/day); (3) REDA A2700N 3.38 inches (1800-3400 RB/day); (4) NOVOMET NF (2500-4400)H 3.62"(2012.58-3018.87 RB/day), and the like. Examples of commercially available motors for ESP unit 130 determined to meet the design parameters of well 106 by the well software model may include the following: (1) Novomet N378AM160-3600V-TRP 134.102HP 3600V 28A; (2) Novomet N378AM110-2760V-TRP 93.8715HP 2760V 28A; and the like. Those skilled in the art will appreciate that other commercially available (or custom designed) pumps and motors may be selected for ESP unit 130 based on design parameters of well 106, including the drift internal diameter of tubing, tubing outside diameter, flow range requirements, sample name plate voltage and amperage, motor horsepower, and the like.

Based on the selected pump 280 and motor 265 for a given ESP unit 130 of a given wellbore 120, corresponding turbine generator 240, and battery 250 of the given ESP unit 130 can also be selected or designed that will meet operating requirements of the selected pump 280 and motor 265, so as to provide a power source that can achieve the target results without having to rely on an external power cable to provide power to ESP unit 130. That is, for the given size of production tubing (e.g., inside diameter) of the wellbore, the hydroelectric turbine generator 240 and battery 250 for ESP unit 130 may be selected from commercially available components (or specifically designed) so that the turbine generator 240 and battery 250 generate the power required to drive the designed ESP unit 130 with the selected pump 280 and motor 265 as per specification in the design. Example manufacturers of commercially available hydroelectric turbine generators include Siemens, GE, Hitachi-Mitsubishi, Wzintop, Jiangsu Naier, and Scott. Power range for the turbine may be from 5KW-500MW, voltage range may be from 2760V-3600V, current range may be from 28-32 Amps. Further, the turbine may be designed to fit into the selected production tubing size of the wellbore. Power range of the battery may be from 5KW-300MW, voltage range may be from 1 KV to 3600 KV, capacity of the battery may be upto 537 Ah (in case of a lithium ion battery pack). further, the battery may be designed to fit into the selected production tubing size of the wellbore.

ESP unit 130 thus eliminates the need for an external power cable running from the well surface to power ESP unit 130. Rather, ESP unit 130 utilizes hydro turbine generator 240 and battery 250 to generate its own power downhole and operate without the need for an external power source. Hydro turbine generator 240 is disposed in the flow path of reservoir fluid flowing through tubular space 175 of production tubing 170. Hydro turbine generator 240 is an energy-producing device which makes use of hydraulic energy of reservoir fluid flowing through tubular space 175 of production tubing 170, converts this energy into mechanical energy by rotation of the turbine, and further converts the mechanical energy into hydro-electric energy with the help of an integrated generator (e.g., voltage regulator, alternator, transformer, and the like).

More specifically, fluid released from the reservoir flows with its hydraulic and kinetic energy into production tubing 170 where ESP unit 130 is disposed. This reservoir fluid enters turbine generator 240 of ESP unit 130 through turbine intake port 245 and flows through a channel or flow passage 241 of turbine generator 240 until the fluid hits a drivable member, e.g., the turbine rotor and/or turbine shaft, and causes rotation of the drivable member. Thus, the flowing reservoir fluid in production tubing 170 supplies energy to the turbine rotor, the rotational action of the rotor spins the shaft, and the spinning action of the shaft activates a generator (e.g., voltage regulator, and alternator), which produces electricity. The torque on the turbine shaft is equivalent to the angular momentum change of the fluid as the blade of the turbine rotor deflects. The power output of turbine generator 240 is equal to the torque on the turbine rotor shaft times the speed of rotation of the shaft. The electricity generated is relatively efficient because of direct conversion of kinetic energy to electric energy.

The generator may be an integral part of hydro turbine generator 240 and is coupled to the shaft of the turbine. The generator takes mechanical energy as input (e.g., energy generated by rotation of the turbine shaft), and outputs electrical energy. The working of the generator derives from the principle of electromagnetic induction, wherein a change in flux linked to a coil induces an electric current in the coil. Using techniques known in the art, design, configuration and other characteristics or parameters of hydro turbine generator 240 can be determined, identified, or selected such that hydro turbine generator 240 can generate the necessary amount of power to continuously operate the selected ESP 280 and the selected motor 265 of the given ESP unit 130. Using the previously described example, in case ESP unit 130 is determined to require a 3.62" series pump rated for 2012-3018 reservoir barrels per day, and a motor rated for 3600 V, 28 A, and 134.102 HP, hydro turbine generator 240 can be selected, designed and/or configured using techniques known in the art such that hydro turbine generator 240 continuously generates from the flowing reservoir fluid, the required amount of power, voltage, and current to operate components of ESP unit 130 including pump 280 and motor 265, without the need for an external power source or a power cable running from the well surface. For example, using techniques known in the art, features like size or shape or design of the turbine and/or generator, type of the turbine and/or generator, materials used, and the like can be optimized so that hydro turbine generator 240 can continuously generate the required amount of power, voltage, and current to operate components of the given ESP unit 130 including the pump 280 and motor 265 that have been selected for ESP unit 130.

ESP unit 130 thus provides continuous power for one or more components of ESP unit 130 using self-generated power, and without relying on any external power source. ESP unit 130 may be disposed and configured to operate effectively at a predetermined pump setting depth (e.g., 5000 feet below surface as determined by the design parameters of the well) in a non-lateral or vertical (e.g., straight or deviated) section of wellbore 120. ESP unit 130 is thus adapted for implementing in any well completion where improvement of outflow performance is required.

Battery 250 suited for application and deployment in ESP unit 130 may be a compact high-powered and/or high-voltage battery (or a package including multiple individual battery units) with outside diameter that is less than the drift internal diameter. Although, engineering for optimum battery size and weight appropriate for deployment may be possible, for operational ease of coupling field application, an estimated length of battery 250 of ESP unit 130 may be about 30 feet. Developments in higher-powered batteries continue to evolve in efficiency, size, weight, and operating costs. High-powered battery 250 may use rare earth materials (e.g., Nickel-Zinc) or optimized hybrid battery systems (e.g., Li-Ion) or similar to result in size and weight reductions, while boosting the reliability and electrical performance of battery 250 under the relatively harsh conditions of wellbore 120. Recent advances in hybrid battery systems in the auto industry has led to reduced costs, weight and size of the battery. A similar approach to hybrid battery design may be used for implementing battery 250 in ESP unit 130. In one embodiment, battery 250 may be a rechargeable type battery with capacity for improved power density, longevity, service life, charge state, and depth of discharge. Other considerations for choice of battery or battery design include environmental friendliness, and relative availability.

Battery 250 may be configured to provide power to control or start operation of one or more components of ESP unit 130 (e.g., motor 265, gauge 260, one or more sensors (not shown in FIG. 2), and the like). In addition, battery 250 may provide ancillary power where peak electric power demand exceeds the electric power output of hydro turbine generator 240. Battery 250 may provide testing, standby, peaking, and/or other emergency backup power functionality for one or more components of ESP unit 130 (e.g., sensors) or other equipment disposed in wellbore 120. In one embodiment, battery 250 may be disposed inside tubular space 175 and be hydraulically coupled with battery activation hydraulic control line 230 that is disposed in TCA 165 and that is adapted to apply hydraulic pressure to a battery circuit to activate battery 250 and start operation of motor 265 using battery power. Battery activation hydraulic control line 230 may thus enable activation of battery 250 from surface based equipment (e.g., by ESP control unit 150 of FIG. 1). Battery 250 thus provides a "black start" method for initially starting pumping operation of ESP 280 and motor 265 of ESP unit 130. Activation of battery 250 for black start power may be controlled from surface based equipment via battery activation hydraulic control line 230 or by wirelessly operating battery 250 under control of ESP control unit 150.

More specifically, during operation, when pump motor 265 of ESP unit 130 is in a power off state or when no power is being generated by hydro turbine generator 240, surface based ESP control unit 150 (e.g., control module) may control (based on user operation, or automatically based on predetermined control logic) to initially start ESP 280 using battery power by wirelessly operating battery 250 or by applying hydraulic pressure on battery activation hydraulic control line 230 that runs from the well surface to the downhole battery activation sub 255 of ESP unit 130. Applying hydraulic pressure on hydraulic line 230 in this way causes transmission of the hydraulic pressure to activation sub 255, causing a circuit of battery 250 to close and activating battery 250. Battery 250 may be communicatively coupled to motor 265 and be configured to provide power to motor 265 when battery 250 is activated. Thus, activating the battery 250 initially starts ESP motor 265. As ESP motor 265 begins to run on battery power, ESP 280, which is submerged in reservoir fluid in tubular space 175 of production tubular 170, is driven by motor 265 and generates higher-pressure fluid flow that causes the turbine of turbine generator 240 to rotate.

More specifically, as shown in FIG. 2, as ESP motor 265 begins to run on battery power, reservoir fluid (or other fluid like injection fluid) entering into ESP unit 130 disposed in production tubular 170 from pump intake port 290 on the downhole side enters ESP 280 at a (lower) pump intake pressure. Motor 265 drives ESP 280 and causes ESP 280 to push this reservoir fluid toward the surface by converting rotary energy into kinetic energy into pressure energy that increases for each subsequent stage of ESP 280. The stages of ESP 280 are components that impart a pressure rise to the reservoir fluid. Each stage of ESP 280 may include a rotating impeller and a stationary diffuser. The stages are stacked in series in a longitudinal direction of wellbore 120 to incrementally increase the pressure to that calculated for the desired flow rate (and based on which the pump 280 and motor 265 were selected for the particular ESP unit 130 installed at the particular wellbore 120). After passing through the last stage (e.g., 150$^{th}$ stage) of ESP 280, pressurized reservoir fluid is discharged from pump discharge port 275 at a pump discharge pressure that is higher than pump intake pressure. In the case of the previously described example where ESP unit 130 is to be set at a depth of 5,000 feet below surface, where pressure at the pump setting depth is determined to be 2,000 psi, where the desired surface wellhead pressure is 500 psi, and where a flowing bottom hole pressure of this reservoir fluid is 1,676 psi, the pump intake pressure at the pump intake port 290 may be around 1,261 psi because fluid pressure decreases with height (i.e., upwards) from the bottom hole. In this example, ESP 280 may boost the fluid pressure to 2,555 psi at discharge. That is, pump discharge pressure of the reservoir fluid at pump discharge port 275 may be 2,555 psi. This fluid discharged at port 275 experiences pressure drop mainly due to gravity and friction along production tubing 170 such that when this fluid reaches the surface, its pressure is at around 500 psi (i.e., the target wellhead pressure).

Continuing with the fluid flow in FIG. 2, fluid discharged at the pump discharge pressure at pump discharge port 275 flows through tubular space 175 until it enters turbine generator 240 via turbine intake port 245. This fluid flows with its hydraulic and kinetic energy through channel or flow passage 241 of turbine generator 240 until the fluid hits a drivable member, e.g., the turbine rotor or shaft, and causes rotation of the drivable member. As a result of rotation of the turbine, the generator of turbine generator 240 starts generating power. And once turbine generator 240 starts generating enough power (e.g., a threshold amount of power generated by turbine generator 240 as detected based on sensor data by a controller), the controller (see FIG. 3) of ESP unit 130 or control unit 150 may control to stop using the battery power (e.g., deactivate battery power use for motor 265) and switch over to turbine generator 240 to power ESP motor 265, and also recharge battery 250 using the turbine generated power. ESP unit 130 thus provides redundancy by way of power stored in rechargeable battery 250 after ESP motor 265 starts. After passing through the channel of turbine generator 240 and rotating the drivable member thereof, the fluid inside turbine generator 240 may be discharged into tubular space 175 of production tubing 170 via tubing packoff/discharge port 235 on the uphole side of ESP unit 130. Power generated by rotation of the turbine is continuously used to power ESP motor 265, which in turn further pumps pressurized fluid into turbine generator 240 to cause the turbine to continuously rotate at high speed and continuously generate hydro-electricity to power ESP motor 265, recharge battery 250, as well as power other components of ESP unit 130 or other downhole components.

After ESP motor 265 is switched over to turbine generator 240 power, the controller (or control unit 150) switches off battery 250. Turbine generator 240 may directly connect (e.g., electrically couple) to and power ESP motor 265, and also directly connect (e.g., electrically couple) to and charge battery 250 during normal continuous operation mode. Turbine generator 240 (or controller 307 or control unit 150) may also include a mechanism to switch and divide power supply from generator 240B in between motor 265 and battery 250 based on the amount of generated hydro-power and based on corresponding power requirements of motor 265 and battery 250. If the charged battery 250 powers ESP motor 265 continuously, the battery capacity may be used up too rapidly. As a result, battery 250 may only be used to initially provide power to start motor 265. Continuously operating ESP motor 265 on battery 250 power under the harsh downhole conditions (e.g., high well temperatures) could reduce battery life or make its use impractical. Thus, battery 250 initially powers ESP motor 265 which initiates flow for pump 280 to start. While pump 280 rotates, it generates fluid flow into turbine generator 240. The ESP generated flow turns the turbine of turbine generator 240 and generates hydro-electricity, which in turn powers ESP motor 265.

Turbine powered ESP unit 130 produces several advantages over conventional systems. First, ESP unit 130 is a compact system (e.g., single piece or unit) that can be installed, deployed, and retrieved riglessly (i.e., without a rig), by utilizing a slickline or coiled tubing unit. Second, since ESP 280 is already submerged in reservoir fluids, it would not need any priming. Therefore, cavitation is not an issue. Third, ESP pump 280 efficiency would be relatively high because not much energy is required to move fluids into pump intake port 290 (because of preexisting reservoir downhole pressure). Fourth, since ESP unit 130 can generate its own power, all cable connections for interconnecting ESP unit 130 components can be embedded within ESP unit 130 and as such, no external cable may be required. Fifth, ESP unit 130 is capable of handling a broad range of water cuts over the producing life of a well. Sixth, surface footprint of ESP unit 130 can be relatively small compared with other artificial lift systems and would find good application in many areas, especially offshore applications. Seventh, ESP unit 130 will reduce ESP failure rate and increase pump run life since external cable is absent from ESP unit 130, which is a major cause of ESP failures in conventional systems. Eighth, ESP unit 130 is cost effective when compared to conventional ESP systems in that the replacement cost of turbine powered ESP unit 130 will drastically reduce in addition to increased ESP run life. The increased ESP run life will also minimize risks associated with well intervention and workover operations to replace the conventional ESP system when it fails.

Figure 3:
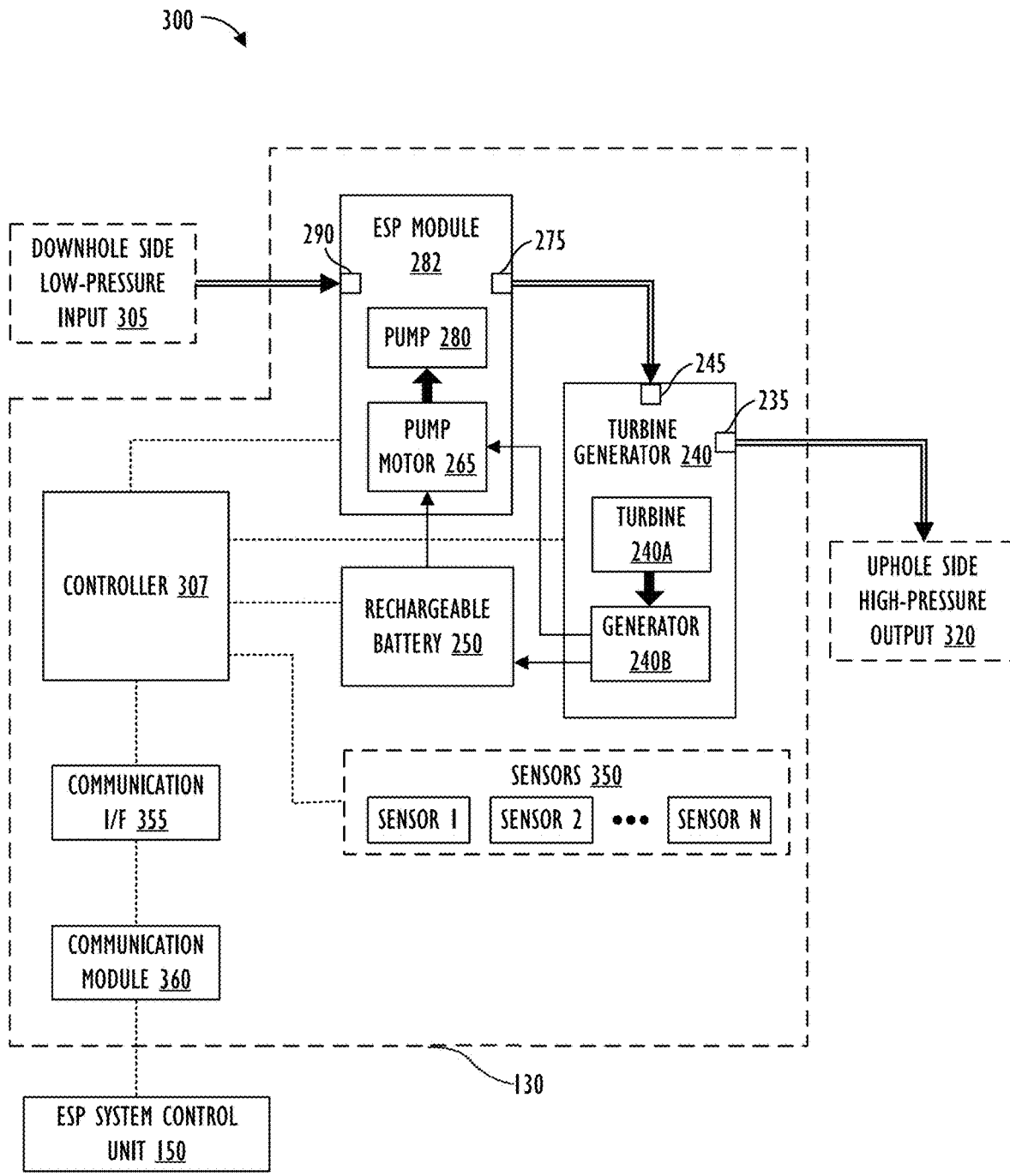
FIG. 3 is a block diagram of a turbine powered ESP system in accordance with one or more embodiments.

FIG. 3 is a block diagram of turbine powered electrical submersible pump system 300 (e.g., artificial lift system) in accordance with one or more embodiments. Elements in FIG. 3 that are generally the same as those in FIGS. 1 and 2 are denoted by like reference numerals and the description thereof will be omitted to avoid duplication. As shown in FIG. 3, ESP unit 130 is fluidly coupled to the flow of reservoir fluid in the production tubing of the wellbore via pump intake and discharge ports 290 and 275, and turbine intake and discharge ports 245 and 235. That is, ESP unit 130 receives reservoir fluid with low intake pressure from the downhole side of ESP unit 130 (block 305). This reservoir fluid is received by ESP module 282, pressurized to a higher discharge pressure, and discharged from pump discharge port 275 to flow into turbine generator 240 via turbine intake port 245 and is discharged via turbine discharge port 235 at uphole side high-pressure output (block 320). Battery 250 is electrically coupled to motor 265, and generator 240B is electrically coupled to both battery 250, and motor 265. Although not specifically shown in FIG. 3, battery 250 and/or generator 240B may also be electrically coupled to zero or more of sensors 350, controller 307, communication interface 355, and communication module 360. As explained previously, turbine 240A of turbine generator 240 spins due to flow of the reservoir fluid passing therethrough, and the spinning of the turbine 240A in turn causes activation of generator 240B which generates electricity. As shown in FIG. 3, the electricity generated by generator 240B is used to directly power pump motor 265 of ESP module 282 and also directly recharge battery 250.

As further shown in FIG. 3, in addition to ESP module 282, turbine generator 240, and rechargeable battery 250, ESP unit 130 may also include controller 307 (e.g., control module), one or more sensors 350, communication interface 355, and communication module 360. Components of ESP unit 130 may be integrated into one compact piece that is disposed within the wellbore (e.g., within production tubing 170). Alternately, one or more components of ESP unit 130 may be distributed across multiple locations of the well environment, downhole locations of the wellbore, or remote locations. For example, components of ESP unit 130 including controller 307 and sensors 350 may be provided and disposed in the single integrated, compact package (e.g., single unit or casing) of ESP unit 130 that is disposed downhole within the wellbore at the predetermined ESP setting depth. As another example, at least some of the sensors 350 and/or at least some of the processing and controlling logic of controller 307 may be provided at other locations (e.g., uphole locations, downhole locations, surface based locations, remote locations) outside the integrated, compact package of ESP unit 130 and communicatively coupled to unit 130.

Sensors 350 (e.g., Sensor 1, Sensor 2, . . . Sensor N) may include one or more of a plurality of types of sensors. For example, sensors 350 may include an optical, light or imaging sensor, a flow or fluid velocity sensor (e.g., flow sensor, flowmeter, and the like), a humidity sensor, a thermal, heat or temperature sensor, a position, angle, displacement, distance, or speed sensor (e.g., laser rangefinder and the like), an optical activity sensor, an optical sensor array, a barometric sensor, a vibration sensor, a barometer, a magnetometer, a thermistor sensor, an electrostatic sensor, a differential light sensor, an opacity sensor, a scattering light sensor, a diffractional sensor, a refraction sensor, a reflection sensor, a velocity sensor, a momentum sensor, a wave radar probe, a pressure gauge, pressure sensor, pressure transducer, current leakage sensor, and the like. The type of sensor is not intended to be limiting and any sensor type or number of sensors can be used so as to enable functionality of ESP system 300 as described herein. A pressure transducer measures pressures with an output voltage linear with pressure. For temperature measurements, a temperature sensor utilizes a calibrated semiconductor with a voltage output linear with temperature. The current leakage sensor may measure current leakage to the earth through the ESP unit. This measure of current leakage may provide an indication that the entire electrical circuit of the system is healthy, well isolated, properly grounded, and the electrical integrity is intact. A pre-defined current leakage value depending on the manufacturer is usually available for monitoring purposes, given in milli-Amps (mA). If the transmitted value deferred from a given range, this indicates an unacceptable current leakage happening within the electrical circuit of the ESP unit, which renders sensor readings from ESP unit unreliable.

Sensors 350 may be disposed at different locations of ESP system 300 or ESP unit 130, and may be configured to detect (e.g., sense) a different types of sensor data. For example, sensors 350 may include sensors disposed downhole in ESP unit 130 and configured to detect one or more types of sensor data associated with one or more of pump intake port 290, pump 280, pump motor 265, pump discharge port 275, turbine intake port 245, turbine 240A, generator 240B, turbine discharge port 235, battery 250, production tubing 170, TCA 165, production tubing hanger 205, production tubing packer 295, WRSSV 225, and the like. In one embodiment, sensors 350 may be configured to detect sensor data related to pump motor current consumption or load, pump motor temperature, sensor tool current leakage, ESP module vibration data, turbine generator vibration data, pump intake port fluid pressure and/or temperature, pump discharge port fluid pressure and/or temperature, turbine intake port fluid pressure and/or temperature, turbine discharge port fluid pressure and/or temperature, battery charge or power level, current power level being generated by turbine generator, current power level being consumed by pump motor, reservoir fluid pressure and/or temperature within or at one or more points or regions of wellbore (e.g., uphole end of production tubing, downhole end of wellbore, at wellhead, and the like), sensor data indicating whether well integrity has been compromised (e.g., uphole or downhole sensors to detect packer failure, casing crack/leak, tubing hanger leak, or collapsed tubing due to excess pressure well annulus, etc.) and the like. Controller 307 and/or control unit 150 may be configured to receive sensor data from sensors 350. The number, type, position, location, angle, and other characteristics of sensors 350 are not intended to be limiting, and may be determined so that ESP system 300 can effectively self-generate power needed to control and operate components (e.g., sensors, pump motor, battery and the like) of ESP unit 130 and discharge reservoir fluid at the target surface wellhead pressure without the need of an external power source.

Controller 307 (e.g., control module) may further be configured to transmit sensor data to surface based ESP system control unit 150 via communication interface 355 and communication module 360. For example, communication module 360 may be a transmitter and receiver provided in ESP unit 130 downhole for fiber optic communication with surface based equipment (e.g., ESP system control unit 150). As another example, communication module 360 may be a transmitter and receiver provided downhole in unit 130 for fluid harmonic communication or electromagnetic signal (i.e., wireless) based communication with surface based equipment. Details of the bi-directional communication between downhole controller 307 and surface based ESP system control unit 150 are described in connection with FIG. 4 below. Controller 307 may be implemented on a computer system that is the same as or similar to computer system 600 described with regard to at least FIG. 6. Controller 307 may be communicatively coupled to ESP module 282, turbine generator 240, rechargeable battery 250, sensors 350, and communication interface 355. Controller 307 may be configured to control operation of one or more of pump 280, pump motor 265, turbine 240A, generator 240B, and battery 250, based on sensor data received from one or more of sensors 350, and based on control instructions received from ESP system control unit 150. Controller 307 may also be configured to record (e.g., log) data indicating the behavior of one or more components of ESP unit 130, corresponding sensor data, and corresponding automated (or user controlled or surface based equipment controlled) operations for battery activation/re-charge, pump motor operation, turbine power generation, and the like. Controller 307 may further be configured to transmit this data (e.g., log data, sensor data) to surface based ESP system control unit 150 via communication interface 355 and communication module 360.

ESP system control unit 150 may include equipment and control logic to operate and control ESP unit 300 and pump wellbore fluid (e.g., production fluid) to surface so that the fluid is output at the wellhead at a predetermined flow rate or pressure. ESP system control unit 150 may be communicatively coupled to ESP module 282, turbine generator 240, and rechargeable battery 250 via controller 307 and be configured to control operation of one or more of pump 280, pump motor 265, turbine 240A, generator 240B, and battery 250, based on sensor data received from one or more of sensors 350. For example, ESP system control unit 150 may include logic and instructions for operating one or more of ESP module 282, turbine generator 240, and rechargeable battery 250, and/or monitoring, regulating and controlling the power generation operation of turbine generator 240, pumping operation of ESP module 282, and battery activation/re-charge operation of battery 250, in order to self-generate power downhole to operate ESP unit 130 and discharge fluid at the target flow rate and pressure at the wellhead on the surface.

For example, based on sensor data received from controller 307, ESP system control unit 150 may determine the current operational state of pump 280, pump motor 265, turbine generator 240, battery 250, and the like. ESP system control unit 150 may further be configured to notify an operator (e.g., wellsite personnel or personnel at a remote site) of the current operational state of ESP system 300. Any appropriate notification system may be implemented for the notifications. For example, the user may be notified of the operations states of components of ESP system 300, error conditions, flow rates, power generation rates, and the like by displaying appropriate data (e.g., data including fluid flow rate, pressure at wellhead, barrels per day, battery charge state, turbine power generation parameters, pump motor power consumption parameters, sensor data, and the like) on a screen, implementing a lighting system (e.g., green light indicating normal operation, red light indicating an error state of a particular component), and the like. ESP system control unit 150 may thus control the current operational state of pump 280, pump motor 265, turbine generator 240, battery 250, and the like, based on the sensor data. For example, control unit 150 may automatically (or based on user operation) turn off any of the components of ESP unit 130.

During operation, when ESP unit 130 is initially operating on battery power (e.g., sensors 350, controller 307, communication interface 355, and communication module 360 powered using battery power, pump motor 265 is turned off, and turbine generator 240 not generating any power) control unit 150 may initially control to start operation of pump motor 265 on battery power by, for example, wirelessly sending instructions to pump motor 265 via controller 307, communication interface 355, and communication module 360, and in case wireless communication is not available, by activating a hydraulic control line (e.g., control line 230 in FIG. 2) to activate the high-voltage battery 250 to supply high-voltage battery power to ESP motor 265. This operation will power motor 265, which will in turn drive ESP 280, and cause ESP 280 to pump wellbore (e.g., production) fluid to the surface and also make the fluid to flow through turbine 240A at high pressure. The flowing wellbore fluid (e.g., production fluid) causes turbine 240A to rotate, and an electrical current is generated by generator 240B. Once generator 240B starts generating enough power, controller 307 (using predetermined logic or based on instructions received from control unit 150) may switch over from using battery power to using power generated by turbine generator 240 to power ESP motor 265. Further, controller 307 (using predetermined logic or based on instructions received from control unit 150) may control to divide power supply in between motor 265 and battery 250 so that power generated by turbine generator 240 is used to simultaneously, continuously and directly power ESP motor 265 while also continuously recharging high-voltage battery 250. ESP unit 130 thus generates its own power to pump fluid to surface at a predetermined pressure, without relying on an external high-tension cable.

Figure 4:
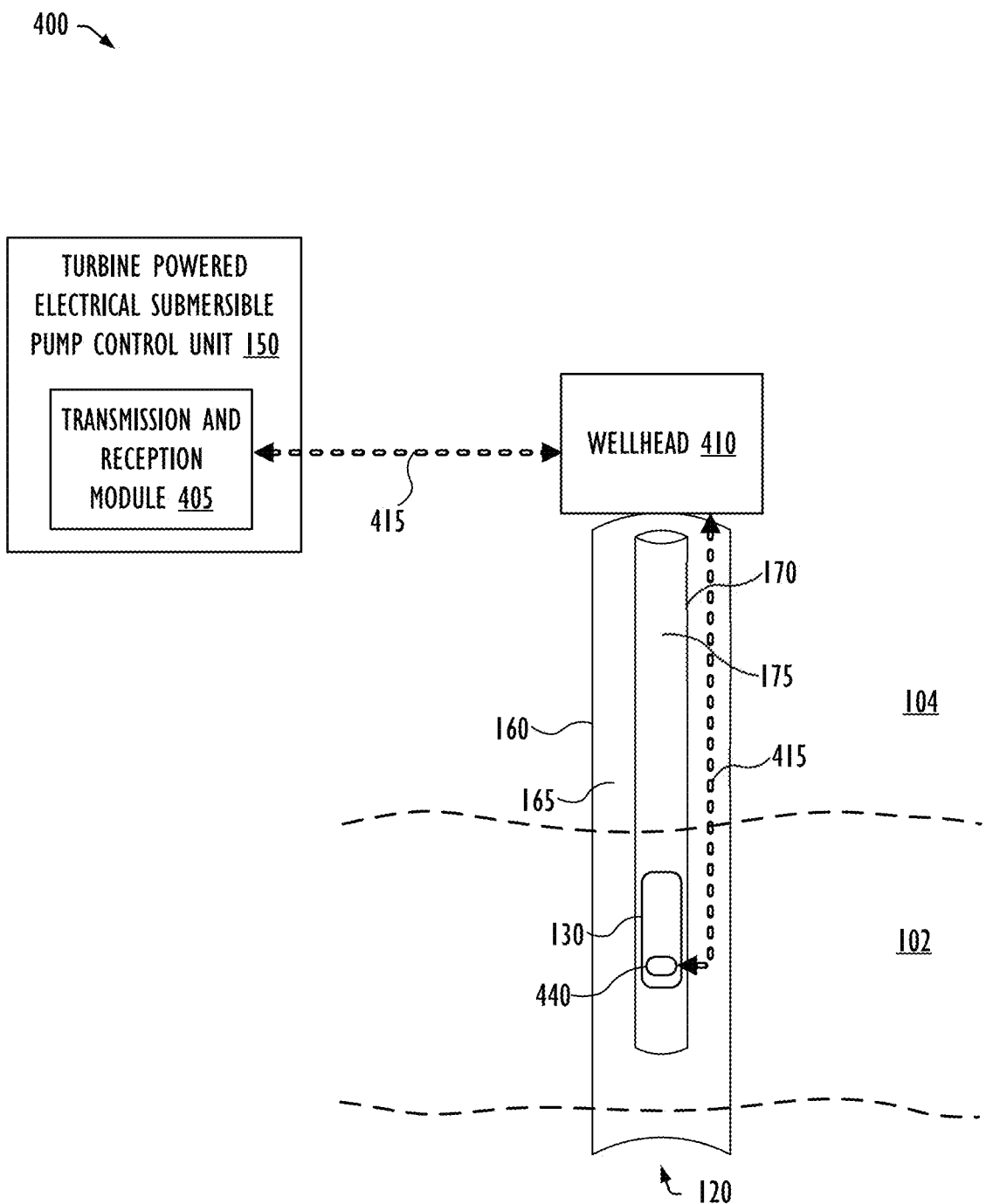
FIG. 4 is a schematic diagram that illustrates bi-directional data communication for the turbine powered ESP system, in accordance with one or more embodiments.

FIG. 4 is a schematic diagram that illustrates bi-directional data communication for turbine powered electrical submersible pump system 400 (e.g., artificial lift system), in accordance with one or more embodiments. Elements in FIG. 4 that are generally the same as those in FIGS. 1-3 are denoted by like reference numerals and the description thereof will be omitted to avoid duplication. As shown in FIG. 4, ESP control unit 150 provided at the surface may include transmission and reception module 405, and ESP unit 130 provided downhole in wellbore 120 at the pump setting depth may also include a counterpart transmission and reception module 440 (e.g., communication module 360 in FIG. 3). Modules 405 and 440 may be configured for bi-directional data and control signal communication using one or more predetermined communication modalities (e.g., wireless or wired communication modalities). For example, modules 405 and 440 may be configured to communicate via a fiber optic cable 415 that is communicatively coupled between modules 405 and 440, and that runs from module 405 at the surface to module 440 downhole at the pump setting depth via wellhead 410. As shown in FIG. 4, fiber optic cable 415 may run along the length of wellbore 120 and be disposed in the tubing casing annulus 165. Alternately, or in addition, modules 405 and 440 may be communicatively coupled wirelessly via fluid harmonics or using electromagnetic signals transmitted downhole via tubular space 175 of production tubing 170 and/or annular space 165 of casing 160. ESP control unit 150 may receive data (e.g., sensor data) from downhole communication module 440 of ESP unit 130, and control operations of one or more components (e.g., pump, motor, turbine generator, and battery) of ESP unit 130 by using the bi-directional communication system.

For example, surface control unit 150 may transmit electrical signals or commands through fiber optics cable 415 to downhole communication module 440 of ESP unit 130, which decodes the signal and relay to corresponding components of ESP unit 130 via the controller. These commands may include commands to start or to shut down one or more components of ESP unit 130. Downhole module 440 of ESP unit 130 may also transmit downhole ESP data (e.g., sensor data) through fiber optics cable 415 to surface control unit 150. For example, sensor data received at the surface may include motor current data, pump or turbine intake pressure data, pump or turbine discharge pressure data, pump or turbine intake/discharge temperature data, pump or motor temperature data, sensor tool current leakage data, vibration data indicating vibration of one or more components of ESP unit 130. Communication module 440 may convey the measured sensor data from ESP unit 130 to the surface for monitoring and analysis to optimize the performance of ESP unit 130 and extend run life of the pump, battery, and other components of ESP unit 130. For protection, fiber optics cable may be disposed inside TCA 165 and clamped on external body of production tubing 170. This cable may then be communicatively coupled with ESP unit 130 downhole at the pump setting depth when the ESP system is deployed. Alternatives for ESP bi-directional data communication may include use of fluid harmonics or other wireless communication method. Some or all of the functionality attributed to control unit 150 at the surface may also be provided by control logic implemented on the controller of ESP unit 130 provided downhole in the wellbore and/or by another control module provided at a remote monitoring and control station.

Figure 5:
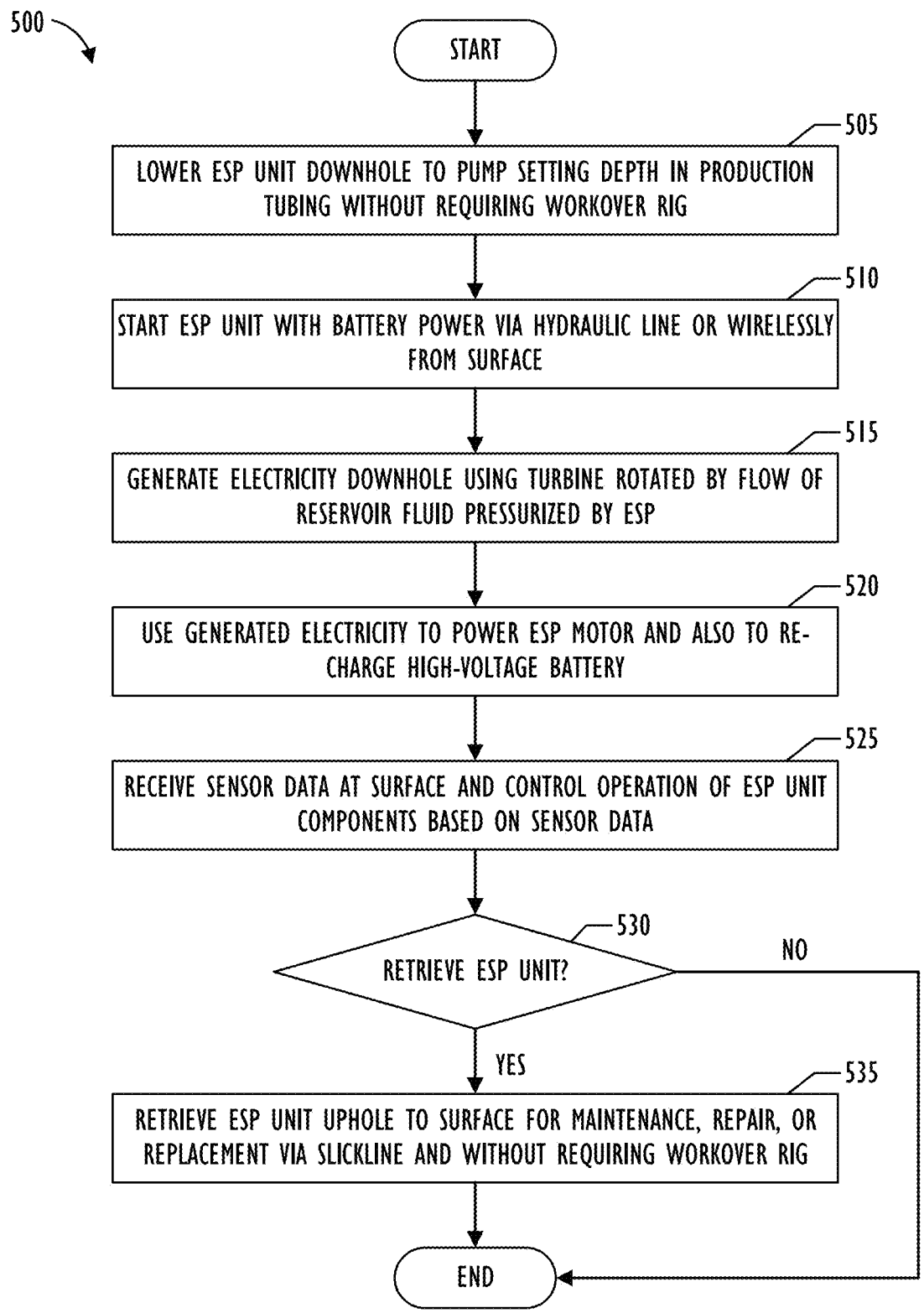
FIG. 5 is a flow chart that illustrates a method for controlling, monitoring, and operating the turbine powered ESP system in accordance with one or more embodiments.

FIG. 5 is a flow chart that illustrates method 500 for controlling, monitoring, and operating the turbine powered electrical submersible pump system in accordance with one or more embodiments. Method 500 starts at block 505 where the wellbore (e.g., wellbore 120) is equipped with the ESP unit (e.g., ESP unit 130) by lowering the ESP unit to the pump setting depth (e.g., as determined for a particular wellbore 120 based on a corresponding well software model) inside the production tubing (e.g., tubing 170 in FIG. 1). As mentioned previously, the ESP unit includes pump and motor that are selected or designed based on design parameters and corresponding requirement specifications identified by the well modelling software for the particular wellbore. The deployed ESP unit according to the present disclosure is a compact system that can be installed riglessly. Killing of well is not required and as such, no damage to the reservoir or significant deferred production would be required. Next, at block 510, the ESP control module (e.g., surface based ESP control unit 150, or downhole controller of ESP unit 130) may control to initially start the ESP motor using battery power by wirelessly operating the high-voltage battery disposed inside the integrated compact ESP unit disposed downhole at the pump setting depth or by applying hydraulic pressure on the battery activation hydraulic control line that runs from surface to the downhole ESP unit. The control module may control the electric coupling between the battery and the prime mover to supply power to the prime mover from the battery power, based on an instruction received from the surface based control unit. Operating the ESP motor using battery power at block 510 drives the ESP and causes it to pump wellbore (e.g., production) fluid to the surface and also cause the fluid to flow through the turbine of the integrated compact ESP unit at high pressure. The flowing production fluid causes the turbine to rotate, and an electrical current is generated by the generator integrally provided with the turbine (block 515).

As explained previously, the turbine extracts energy from the flowing fluid as the fluid flows past the channel of the turbine. The turbine primes the fluid and converts its energy to mechanical energy, which causes the generator, which may include a rotor and a stator, to spin. The turning action of the rotor in the stator generates electric current. Operation then proceeds to block 520 where, once the generator starts generating enough power, the control module (e.g., controller 307 or control unit 150) may detect generation of electricity by the turbine generator based on the sensor data. For example, a current/voltage sensor coupled to the generator may output data to the control module communicatively coupled thereto indicating the electric power (e.g., voltage value, current value, and the like) generated by the generator of the downhole ESP unit. Based on the detected sensor data, and based on a predetermined threshold value (e.g., minimum current or voltage value of generated electric power required to switch ESP motor to using turbine generator power), the control module may control to switch over from using battery power to using power generated downhole by the turbine generator to power the ESP motor. At block 520, based on the detected electric power generated by the turbine generator, the control module may control the electric coupling between the battery and the prime mover (e.g., motor 265), and the electric coupling between the turbine generator and the prime mover to stop powering the prime mover with the battery power and to start supplying the turbine generator electric power to the prime mover to power the prime mover. That is, the control module may control to directly feed the power generated by the turbine generator to the ESP motor to operate the ESP and pump pressurized reservoir fluid with the desired flow rate and pressure toward the surface. The ESP controller at block 520 may further control to divide power supply in between the ESP motor and the high-voltage rechargeable battery so that power generated by the turbine generator is used to directly, simultaneously and continuously power the ESP while also charging the high-voltage battery of the downhole ESP unit.

At block 525, the ESP controller may utilize a bi-directional communication system (e.g., as shown in FIG. 4) to transmit sensor data associated with one or more components of the downhole ESP unit to the surface based equipment (e.g., control unit 150). Sensor data may be transmitted continuously, periodically, aperiodically, based on user operation, and the like. Based on the received sensor data, the ESP control unit of the ESP system may determine whether to continue to operate ESP motor to pressurize and flow reservoir fluid to the surface using the turbine power generated downhole by the ESP system or to retrieve the ESP system for repair, maintenance or replacement operation on one or more components of the downhole ESP unit (block 530). For example, in case an error condition (e.g., temperature of one or more components of the ESP system higher than threshold, intake or discharge pressure of ESP system outside of a predetermined range, current leakage, battery charge level, malfunction of one or more components of the ESP system, and the like) is detected based on the sensor data and based on predetermined (automated or user input based) control logic of the control unit, the ESP control system may determine at that it will be necessary to conduct a repair, maintenance or replacement operation on one or more components of the downhole ESP unit. In case ESP control unit determines that the ESP system is to be retrieved (YES at block 530), operation proceeds to block 535 where the integrated, compact ESP system is retrieved by utilizing a slickline or wireline, without the need for a costly workover rig and without causing any damage to the reservoir or without requiring significant deferred production.

Figure 6:
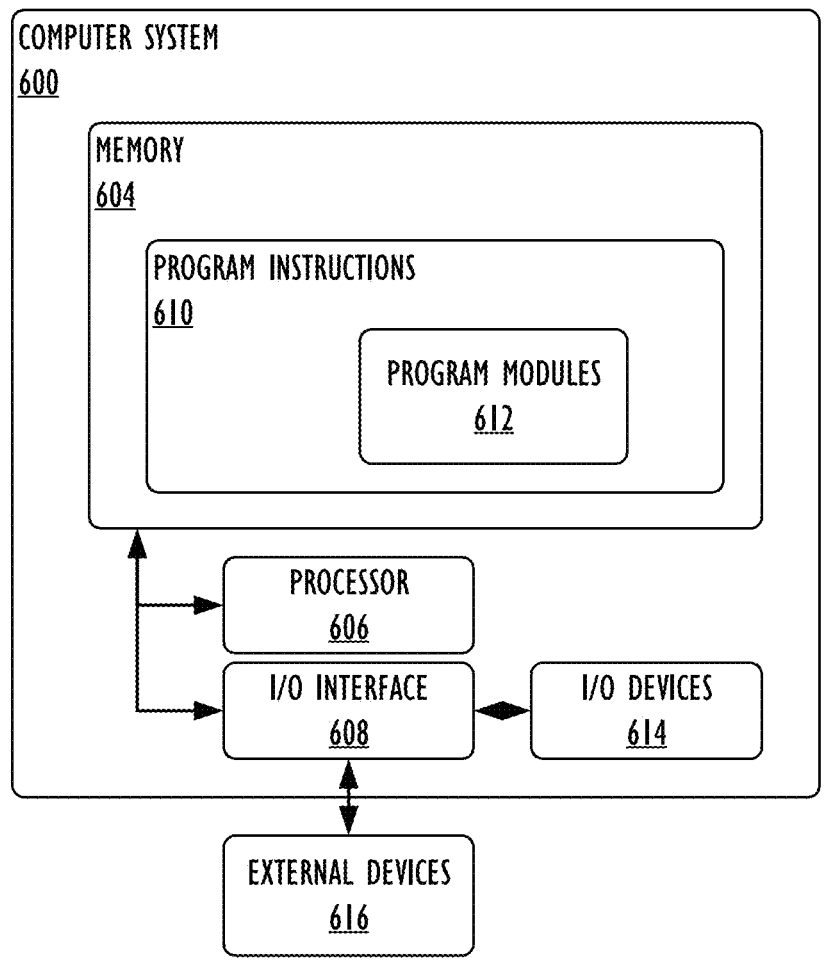
FIG. 6 is a functional block diagram of an exemplary computer system in accordance with one or more embodiments.

FIG. 6 is a functional block diagram of an exemplary computer system (or "system") 600 in accordance with one or more embodiments. In some embodiments, system 600 is a programmable logic controller (PLC). System 600 may include memory 604, processor 606 and input/output (I/O) interface 608. Memory 604 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). Memory 604 may include a non-transitory computer-readable storage medium (e.g., non-transitory program storage device) having program instructions 610 stored thereon. Program instructions 610 may include program modules 612 that are executable by a computer processor (e.g., processor 606) to cause the functional operations described, such as those described with regard to well control system 140, ESP control unit 150, controller 307, ESP unit 130, ESP system 300 or 400, or method 500.

Processor 606 may be any suitable processor capable of executing program instructions. Processor 606 may include a central processing unit (CPU) that carries out program instructions (e.g., the program instructions of the program modules 612) to perform the arithmetical, logical, or input/output operations described. Processor 606 may include one or more processors. I/O interface 608 may provide an interface for communication with one or more I/O devices 614, such as a joystick, a computer mouse, a keyboard, or a display screen (for example, an electronic display for displaying a graphical user interface (GUI)). I/O devices 614 may include one or more of the user input devices. I/O devices 614 may be connected to I/O interface 608 by way of a wired connection (e.g., an Industrial Ethernet connection) or a wireless connection (e.g., a Wi-Fi connection). I/O interface 608 may provide an interface for communication with one or more external devices 616. In some embodiments, I/O interface 608 includes one or both of an antenna and a transceiver. In some embodiments, external devices 616 include logging tools, lab test systems, well pressure sensors, well flowrate sensors, ESP monitoring gauge 260, or any of sensors 350 described in connection with ESP system 300 or 400.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. An artificial lift system for artificially lifting fluid from a wellbore, comprising:
   a pump that has a pump intake port and a pump discharge port, wherein the pump is adapted to intake wellbore fluid from the pump intake port at a pump intake pressure, pressurize the wellbore fluid, and discharge the wellbore fluid from the pump discharge port at a pump discharge pressure that is higher than the pump intake pressure;
   a prime mover that is coupled to the pump and that drives the pump; and
   a turbine generator that has a flow passage for the pressurized wellbore fluid, the flow passage being disposed between a turbine intake port and a turbine discharge port of the turbine generator,
   wherein the turbine intake port is fluidly coupled to the pump discharge port, wherein the turbine generator is configured to generate electric power from the pressurized wellbore fluid flowing through the flow passage of the turbine generator, and wherein the turbine generator is electrically coupled to the prime mover and is configured to power the prime mover with the electric power generated from the flowing pressurized wellbore fluid.

2. The artificial lift system according to claim 1, wherein the turbine generator comprises a turbine rotor, a shaft, and a generator, wherein the turbine rotor is configured to rotate by absorbing mechanical energy from the wellbore fluid flowing through the flow passage and to spin the shaft, and wherein the spinning of the shaft activates the generator and causes the generator to generate the electric power.

3. The artificial lift system according to claim 1, wherein the pump is an electrical submersible pump that is adapted to be submerged in the wellbore fluid flowing inside a tubular space of a production tubing of a wellbore, and wherein the prime mover is an electric motor that is rated to drive the electrical submersible pump so that the wellbore fluid is discharged from the pump discharge port at the pump discharge pressure.

4. The artificial lift system according to claim 1, further comprising a battery that is electrically coupled to the prime mover and is configured to power the prime mover, wherein the turbine generator is further electrically coupled to the battery and is configured to recharge the battery, and wherein the pump, the prime mover, the turbine generator, and the battery are configured to be disposed in a compact, retrievable artificial lift unit that is adapted to be deployed at a predetermined pump setting depth downhole inside a tubular space of a production tubing of a wellbore.

5. The artificial lift system according to claim 4, wherein the artificial lift unit is configured to power components thereof using the electric power generated by the turbine generator, without utilizing a power source or a power cable external to the artificial lift unit.

6. The artificial lift system according to claim 4, wherein the artificial lift unit is retrievable from the wellbore via slickline or wireline, without requiring a workover rig.

7. The artificial lift system according to claim 4, further comprising:
   one or more sensors that detect sensor data associated with one or more components of the artificial lift unit; and a control module that is communicatively coupled to the prime mover, the turbine generator, the battery, and the one or more sensors, and that is configured to:
control the electric coupling between the battery and the prime mover to initially power the prime mover with battery power when the prime mover is in a power off state;
detect generation of electricity by the turbine generator based on the sensor data;
control the electric coupling between the battery and the prime mover, and the electric coupling between the turbine generator and the prime mover to stop powering the prime mover with the battery power and to start powering the prime mover with the turbine generator electric power.

8. The artificial lift system according to claim 7, wherein the control module is further configured to control the electric coupling between the turbine generator and the prime mover, and the electric coupling between the turbine generator and the battery to divide and supply the turbine generator electric power to the prime mover and to the rechargeable battery so that the prime mover is continuously powered by the turbine generator electric power to drive the pump and discharge the wellbore fluid, while simultaneously recharging the battery.

9. The artificial lift system according to claim 7, wherein the control module is a surface based control unit that is disposed at a wellhead, and wherein the control unit is configured to power the prime mover with the battery power by applying hydraulic pressure on a battery activation hydraulic control line that runs from the wellhead to the artificial lift unit disposed downhole at the predetermined pump setting depth, that is hydraulically coupled to the battery, and that activates the battery by closing a battery circuit in response to the applied hydraulic pressure.

10. The artificial lift system according to claim 7, wherein the control module is a controller that is disposed in the artificial lift unit deployed downhole at the predetermined pump setting depth, and wherein the controller is configured to control the electric coupling between the battery and the prime mover based on instructions received from a surface based control unit of the artificial lift system.

11. The artificial lift system according to claim 7, wherein:
the sensor data includes at least one of prime mover current data, pump intake pressure data, pump discharge pressure data, pump intake temperature data, pump discharge temperature data, current leakage data, and vibration data, and
the control module is a surface based control unit that is disposed at a wellhead and that is configured to receive the sensor data from the downhole artificial lift unit, wherein the control unit is configured to control an operational state of at least one of the prime mover, the turbine generator, and the battery based on the received sensor data.

12. The artificial lift system according to claim 7, wherein the control module is a surface based control unit that is disposed at a wellhead, and wherein the control unit is configured to control the powering the prime mover with the battery power by wirelessly activating the battery.

13. A method for artificially lifting fluid from a wellbore, the method comprising:
activating a battery of an artificial lift unit disposed downhole at a predetermined pump setting depth inside a tubular space of a production tubing of a wellbore;
supplying power from the activated battery to a prime mover of the artificial lift unit to power the prime mover with battery power;
driving a pump of the artificial lift unit with the prime mover to pressurize wellbore fluid flowing in from an intake port of the pump, and discharge the pressurized wellbore fluid from a discharge port of the pump;
generating electric power from the pressurized wellbore fluid by flowing the pressurized wellbore fluid discharged from the discharge port of the pump through a flow passage of a turbine generator of the artificial lift unit; and
supplying the electric power generated by the turbine generator to the prime mover to power the prime mover with the turbine generator electric power.

14. The method according to claim 13, wherein supplying the electric power generated by the turbine generator to the prime mover to power the prime mover with the turbine generator electric power comprises:
detecting generation of electricity by the turbine generator based on sensor data; and
controlling an electric coupling between the battery and the prime mover, and an electric coupling between the turbine generator and the prime mover to stop powering the prime mover with the battery power and to start powering the prime mover with the turbine generator electric power.

15. The method according to claim 13, wherein the artificial lift unit is a compact, retrievable unit that is deployed at the predetermined pump setting depth downhole inside the tubular space of the production tubing of the wellbore.

16. The method according to claim 13, wherein the prime mover is continuously powered with the electric power generated by the turbine generator of the artificial lift unit, without utilizing a power source external to the artificial lift unit.

17. The method according to claim 13, further comprising retrieving the artificial lift unit from the wellbore via slickline or wireline, without requiring a workover rig.

18. The method according to claim 13, further comprising supplying the electric power generated by the turbine generator to the battery to recharge the battery with the turbine generator electric power, wherein the turbine generator electric power is divided and supplied to the prime mover and to the battery so that the prime mover is continuously powered by the turbine generator electric power to drive the pump and discharge the wellbore fluid, while simultaneously recharging the battery.

19. The method according to claim 13, wherein activating the battery comprises applying hydraulic pressure on a battery activation hydraulic control line that runs from a wellhead to the artificial lift unit disposed downhole at the predetermined pump setting depth, and that is hydraulically coupled to the battery, and that activates the battery by closing a battery circuit in response to the applied hydraulic pressure.

20. The method according to claim 13, wherein the battery is activated wirelessly from a surface based control unit to supply power to the prime mover.

21. A turbine-powered electrical submersible pump unit, comprising:
an electrical submersible pump (ESP) that has a pump intake port and a pump discharge port, wherein the ESP is adapted to intake wellbore fluid from the pump intake port at a pump intake pressure, pressurize the wellbore fluid, and discharge the wellbore fluid from the pump discharge port at a pump discharge pressure that is higher than the pump intake pressure;

a motor that is coupled to the ESP and that drives the ESP;

a turbine generator that has a flow passage for the pressurized wellbore fluid, the flow passage being disposed between a turbine intake port and a turbine discharge port of the turbine generator, wherein the turbine intake port is fluidly coupled to the pump discharge port, wherein the turbine generator is configured to generate electric power from the pressurized wellbore fluid flowing through the flow passage of the turbine generator, and wherein the turbine generator is electrically coupled to the motor and is configured to power the motor with the electric power generated from the flowing pressurized wellbore fluid; and a battery that is electrically coupled to the motor and is configured to initially power the motor, wherein the turbine generator is further electrically coupled to the battery and is configured to recharge the battery.

\* \* \* \* \*